United States Patent
Sampathkumaran et al.

(10) Patent No.: US 9,232,247 B2
(45) Date of Patent: Jan. 5, 2016

(54) SYSTEM AND METHOD FOR CORRELATING AUDIO AND/OR IMAGES PRESENTED TO A USER WITH FACIAL CHARACTERISTICS AND EXPRESSIONS OF THE USER

(71) Applicant: SONY CORPORATION, Tokyo (JP)

(72) Inventors: Sriram Sampathkumaran, San Diego, CA (US); Seungwook Hong, San Diego, CA (US); Helmut Neumann, Urbandale, IA (US); Eric Yam, San Diego, CA (US)

(73) Assignee: Sony Corporation, Tokyo (JP)

(*) Notice: Subject to any disclaimer, the term of this patent is extended or adjusted under 35 U.S.C. 154(b) by 267 days.

(21) Appl. No.: 13/627,466

(22) Filed: Sep. 26, 2012

(65) Prior Publication Data

US 2014/0089954 A1     Mar. 27, 2014

(51) Int. Cl.
| | |
|---|---|
| *H04N 7/16* | (2011.01) |
| *H04H 60/33* | (2008.01) |
| *H04N 21/25* | (2011.01) |
| *H04N 21/258* | (2011.01) |
| *H04N 21/4223* | (2011.01) |
| *H04N 21/658* | (2011.01) |
| *H04N 21/81* | (2011.01) |

(52) U.S. Cl.
CPC ............ *H04N 21/252* (2013.01); *H04N 21/258* (2013.01); *H04N 21/4223* (2013.01); *H04N 21/6582* (2013.01); *H04N 21/812* (2013.01)

(58) Field of Classification Search
CPC ............ H04N 21/812; H04N 21/6582; H04N 21/4223; H04N 21/252; H04N 21/258
USPC ........................................ 725/9–14; 382/118
See application file for complete search history.

(56) References Cited

U.S. PATENT DOCUMENTS

| | | | |
|---|---|---|---|
| 5,676,138 A * | 10/1997 | Zawilinski .................... 600/301 |
| 5,781,650 A * | 7/1998 | Lobo et al. ..................... 382/118 |
| 6,585,521 B1 * | 7/2003 | Obrador ......................... 434/236 |
| 7,113,916 B1 * | 9/2006 | Hill ............................... 705/7.32 |
| 7,137,070 B2 | 11/2006 | Brown et al. |
| 7,848,548 B1 * | 12/2010 | Moon et al. .................... 382/118 |
| 8,438,590 B2 * | 5/2013 | Crenshaw ........................ 725/10 |
| 2002/0178447 A1 * | 11/2002 | Plotnick et al. .................. 725/36 |
| 2005/0071865 A1 * | 3/2005 | Martins ............................ 725/10 |
| 2005/0289582 A1 * | 12/2005 | Tavares et al. ................... 725/10 |
| 2009/0285456 A1 * | 11/2009 | Moon et al. .................... 382/118 |
| 2010/0106707 A1 | 4/2010 | Brown et al. |
| 2011/0188713 A1 | 8/2011 | Wooi et al. |
| 2011/0202968 A1 * | 8/2011 | Nurmi ............................... 726/1 |
| 2011/0305394 A1 | 12/2011 | Singer et al. |
| 2012/0222058 A1 * | 8/2012 | el Kaliouby et al. ........... 725/10 |
| 2012/0324494 A1 * | 12/2012 | Burger et al. .................... 725/12 |
| 2013/0080348 A1 | 3/2013 | Pantaliano et al. |

* cited by examiner

*Primary Examiner* — Hunter B Lonsberry
*Assistant Examiner* — Patrick A Ryan
(74) *Attorney, Agent, or Firm* — John L. Rogitz; John M. Rogitz

(57) ABSTRACT

A computer includes at least one processor and at least one computer readable storage medium accessible to the processor. The medium bears instructions executable by the processor to cause the processor to receive at least one image of at least one viewer of a display on which content is presented. The instructions also cause the processor to generate a signal representative of at least one expression of the viewer made at or around the time the content was presented based on the image of the viewer, and also to receive metadata identifying the content. The instructions then cause the processor to associate the metadata identifying the content with the at least one expression of the viewer.

19 Claims, 3 Drawing Sheets

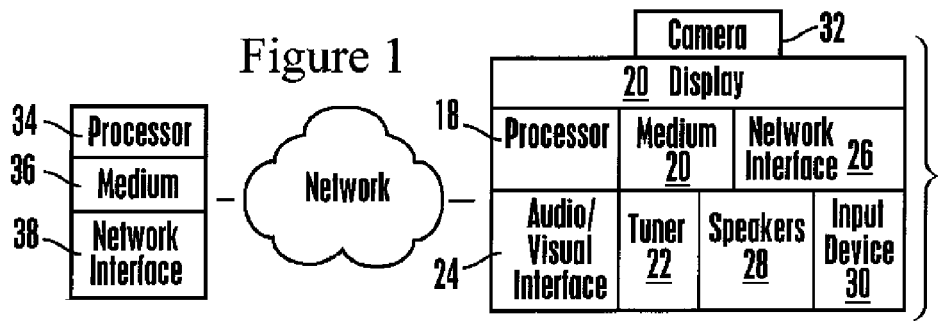
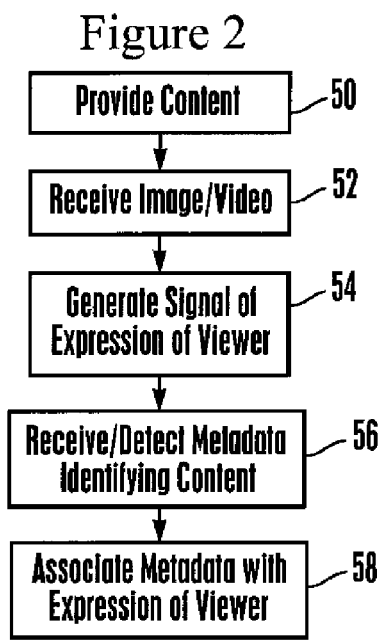
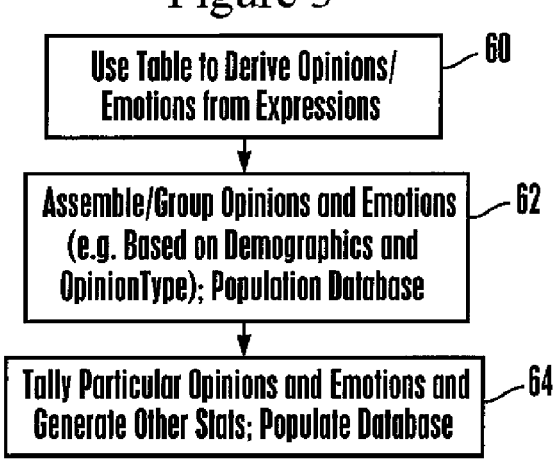

Figure 5

| Expression | Opinion | Emotion |
|---|---|---|
| Laughter | Favorable | Very Happy |
| Smile | Favorable | Happy |
| Straight Face | Neutral | Apathetic |
| Frown | Unfavorable | Unhappy |
| Wide-eyes | Unfavorable | Disbelief |
| Jaw Clenched | Unfavorable | Anger |

Figure 6

Content

Would you like to share image with content provider? Press 1 for yes, 2 for no.

Figure 7

Content

Auto/Always share image with this content provider? Press 1 for yes, 2 for no.

Figure 8

Generate Report?
- Yes
- No

Submit

Figure 9

Include:

Demographics:
- Age
- Race
- Gender

Opinion Type:
- Extremely Favorable
- Favorable
- Neutral
- Unfavorable
- Extremely Unfavorable Also include:
- Tally of opinions
- Tally of favorable and extremely favorable opinions
- Tally of unfavorable and extremely unfavorable opinions
- Tally of Neutral
- Time of day content viewed
- Channel/Network on which content provided

Figure 10

```
         132      134       136        ←130
                  Form     Emotion
         Viewer 1  F
         Viewer 2  F
         Viewer 3  F
         ─────────────────────────────
         Viewer 4  U    Bored (Straight Face)
         Viewer 5  U    Hostile (Angry Face/Frown)
```

Figure 11

```
   Favorable Views: 108
   Unfavorable Views: 108     ←140
   % Caucasian: 20
   % African American: 30
   % 18 - 49: 40
   % Under 18: 30
   % Over 49: 30
   % Laughing: 20
   % Smiling: 20
```

SYSTEM AND METHOD FOR CORRELATING AUDIO AND/OR IMAGES PRESENTED TO A USER WITH FACIAL CHARACTERISTICS AND EXPRESSIONS OF THE USER

FIELD OF THE INVENTION

The present application relates generally to correlating content presented to a user with facial expressions of the user when observing the content.

BACKGROUND OF THE INVENTION

Content providers such as television networks, advertisers, video websites (e.g., YouTube), etc., often wish to know how viewers react to and/or feel about the content they provide. For instance, Nielsen ratings and "ratings weeks" are used to provide a metric for network television stations to gauge the popularity of the programs they provide. Such metrics provide a way for content providers to improve their programming and make it more agreeable to viewers.

SUMMARY OF THE INVENTION

Present principles recognize that more effective approaches may be provided for content providers to determine whether the content they provide is agreeable to viewers and/or to determine the kinds of viewer reactions to their content. Present principles also recognize that the integration of cameras with, e.g., computers and televisions (TVs) has provided the opportunity for content providers to utilize this integration for such purposes, including, e.g., targeted advertising, increasing viewer satisfaction with programming, etc.

Accordingly, in one aspect, a computer includes at least one processor and at least one computer readable storage medium accessible to the processor. The medium bears instructions executable by the processor to cause the processor to receive at least one image of at least one viewer of a display on which content is presented. The instructions also cause the processor to generate a signal representative of at least one expression of the viewer made at or around the time the content was presented based on the image of the viewer, and to receive metadata identifying the content. The instructions then cause the processor to associate the metadata identifying the content with the at least one expression of the viewer.

If desired, prior to receiving at least one image of the viewer, the instructions may cause the processor to provide the content to the viewer. Also if desired, after associating the metadata identifying the content with an expression of the viewer, the instructions may cause the processor to access at least one database and populate the database with at least one opinion for each of plural viewers regarding the content presented to the viewers. Each opinion may be derived from the at least one expression of each viewer using, e.g., a table that associates opinions with expressions.

Also in exemplary embodiments, the database may be populated such that data regarding favorable opinions of the content is grouped together and data regarding unfavorable opinions of the content is grouped together. Even further, the processor may populate the database to also include a tally of favorable opinions regarding the content and a tally of unfavorable opinions regarding the content. Moreover, the database may be populated such that it is searchable based on, e.g., viewer demographics and/or the type of opinion.

In another aspect, a method includes receiving at least one image of at least one viewer of a display on which content is presented and generating a signal representative of at least one expression of the viewer made at or around the time the content was presented based on the image of the viewer. In addition, or in lieu of receiving the at least one image, the method includes receiving a signal representative of at least one expression of the at last one viewer made at or around the time the content was presented derived from at least one image of the viewer. Either way, the method then includes detecting metadata that identifies the content and associating the metadata identifying the content with the at least one expression of the viewer.

In yet another aspect, a device includes at least one processor and at least one computer readable storage medium accessible to the processor. The medium bears instructions executable by the processor to cause the processor to associate metadata identifying content with at least one expression of at least one observer of the content made at or around the time the content was observed.

The details of the present invention, both as to its structure and operation, can be best understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a flow chart of example logic for associating content with at least one expression of a viewer of the content in accordance with present principles;

FIG. 3 is a flow chart of example logic for determining and organizing opinions and/or emotions of viewers that observed the same content in accordance with present principles;

FIG. 4 is an exemplary index for identifying content presented to a viewer in accordance with present principles;

FIG. 5 is an exemplary index for associating opinions with expressions in accordance with present principles;

FIGS. 6 and 7 are exemplary user interfaces (UIs) that may be presented to viewers of content in accordance with present principles;

FIGS. 8 and 9 are exemplary user interfaces (UIs) that may be presented to content providers in accordance with present principles; and FIGS. 10 and 11 are exemplary reports of opinions/emotions of viewers that observed a particular piece of content in accordance with present principles.

DETAILED DESCRIPTION OF THE PREFERRED EMBODIMENT

Referring initially to the exemplary embodiment shown in FIG. 1, a system generally designated 10 is shown. The system 10 includes a consumer electronics device 12 and a server 14. The consumer electronics (CE) device may be, by way of example, a desktop computer, a laptop computer, a tablet computer, a smartphone, or a television such as a high-definition TV, smart TV, and/or Internet-enabled TV. Thus, in some embodiments, the CE device 12 may be, but is not limited to, a Sony Bravia high-definition television manufactured by Sony Corporation.

In the exemplary embodiment shown, the CE device 12 includes a display 16 for presenting, e.g., user interfaces, video, and/or images, and may be a high-definition and/or touch-screen display in exemplary embodiments. The CE device also includes a processor 18, tangible computer readable storage medium 20 such as disk-based or solid state storage, a TV tuner 22, and an audio/video interface 24 to communicate with other devices such as, e.g., a set-top box, DVD player, or video game console over, e.g., an HDMI connection. The CE device 12 also includes a network interface 26 for communication over a network such as the Internet that may be, e.g., a wired or wireless modem or router, or other appropriate interface such as, e.g., a wireless telephony transceiver. Thus, the network interface 26 provides connectivity to the server 14, it being understood that the server 14 also has a network interface (to be described shortly) for facilitating the connectivity.

In addition to the foregoing, the CE device 12 includes one or more speakers 28 for outputting audio signals. Thus, the CE device 12 can receive audio-video programs and/or other content from multiple sources including, e.g., the Internet, cable TV providers, and satellite TV providers, and present it under control of the processor 18 on the display 16 and speakers 28. Furthermore, it is to be understood that viewer commands to the processor 18 may be received from one or more input devices 30 such as mice, keyboards, keypads, remote controls, touchpads, touch screens, etc. Last, note that the CE device 12 also includes a camera 32 that may be, e.g., a thermal imaging camera, a digital camera such as a webcam, and/or camera integrated into a TV. Regardless, it is to be understood that the camera 32 is controllable by the processor 18 to take, e.g., pictures/images and video of viewers of content presented on the CE device 12 in accordance with present principles.

As mentioned above, also shown in FIG. 1 is a server 14. The server 14 includes a processor 34 and tangible computer readable storage medium 36 such as disk-based or solid state storage. As also indicated above, the server 14 includes a network interface 38 for communication over a network such as the Internet that may be, e.g., a wired or wireless modem or router, or other appropriate interface such as, e.g., a wireless telephony transceiver. Thus, the network interface 38 allows for communication with the CE device 12 through, e.g., the network interface 26 over a network such as the Internet, the Internet being generally designated 40 in FIG. 1.

Before describing the logic shown in FIG. 2, note that it is to be understood that, e.g., the processor 34 is capable of executing all or part of the logic discussed below to undertake present principles, although in some embodiments the processor 18 may execute some or all of the logic discussed below. Moreover, software code implementing present logic executable by, e.g., the processors 18 and 34 may be stored on one or more of the mediums shown (the computer readable storage mediums 20 and 36) to undertake present principles.

Now in reference to FIG. 2, a flow chart of example logic to be executed by a processor in a server or other suitable computer in accordance with present principles (such as, e.g., the processor 34 described above) for associating content with the at least one expression of a viewer of the content is shown. Note that the content may be audio content, images, video content, and/or audio-video content such, e.g., as a commercial or network TV program. At any rate, the logic begins at block 50. At block 50, the server provides content to a CE device, such as the CE device 12 over, e.g., a network such as the Internet or a satellite TV network. When providing the content, the server may also provide instructions and/or commands to the CE device to, e.g., take a picture using a camera on the CE device while the content is being presented, although it is to be understood that a viewer of the CE device may optionally instruct the processor of the CE device to take a picture using the camera on the CE device and send it to the server/content provider.

Regardless, the point is that after providing content to the CE device at block 50, at block 52 the server receives back an image/picture/video of a viewer of the content using the CE device. After receiving the image at block 52, the logic moves to block 54 where a signal is generated based on the image/picture/video representative of at least one expression made by the viewer, it being understood that the expression captured in the image was made at or around the time the content was presented on the CE device. However, note that in other exemplary embodiments the signal may be generated at the CE device rather than the server, and therefore the server may just receive the signal rather than the image itself. Nonetheless, it is to be understood that the signal may include, e.g., metadata regarding the viewer's facial expression.

Furthermore, it is to also be understood that the expression is based on the image of the viewer and may be generated using, e.g., facial recognition software/technology such as, but not limited to, Sony Corporation's Picture Motion Browser and/or eFace engine. Even further, it is to be understood that the facial recognition software may be used to detect people and faces not just as a whole, but used to detect particular characteristics and/or attributes of a person such as, e.g., the age, gender, race, feature colors (e.g., eye color, skin tone, hair color), height, weight, etc., and render metadata and/or other information based thereon. The facial recognition software is also understood to be used to detect facial dimensions and, of particular relevance to present principles, particular facial expressions made by viewers and render metadata and/or other information based thereon. Thus, it is to be understood that the facial recognition software may detect facial expressions such as, but not limited to, a smile, a confused look, a frown, a raised eyebrow, a frustrated look, a grimace, a scornful look, laughter, an enraged look, a curious look, a surprised look, a "straight face" and/or noncommittal look, an apathetic look, etc.

Also note that in some embodiments, the facial recognition software may create, e.g., a searchable and/or organizeable data structure/index that can be used by, e.g., social networking services/sites, advertisers, media content providers, TV broadcasters, video and image archives, digital services providers, etc. Thus, one of the entities/services disclosed immediately above may search such an index or data structure for people and/or their images using search parameters such as, e.g., "red hair," "green eyes," "people laughing," "people frowning," "bald men," "intensely watching teenagers," etc. to return results such as a list of people meeting the search parameters.

Continuing in reference to FIG. 2, after the logic receives/generates a signal at block 54 as set forth above, the logic moves to block 56 where the logic also receives and/or detects metadata identifying the content that was presented to the viewer, and thus the content that was presented at or around the time the image of the viewer was taken. Note that in exemplary embodiments the metadata identifying the content may be received from the CE device, and/or it may be identified/detected locally on the server as the being the particular metadata associated with the content provided to the CE device. Regardless, the exemplary logic concludes at bock 58 where the logic associates the metadata identifying the content with at least one facial expression of the viewer using, e.g., association principles known in the art.

Continuing the detailed description in reference to FIG. 3, a flow chart of example logic to be executed by a processor in a server or other suitable computer in accordance with present principles (such as, e.g., the processor 34 of the server 14) for determining and organizing opinions and/or emotions of viewers that observed the same content in accordance with present principles is shown. Beginning at block 60, the signal representative of at least one expression made by the viewer that was generated, e.g., as set forth above may be used by the logic of FIG. 3 to determine and/or derive an opinion and/or emotion of the viewer based on the expression. The opinion/emotion is determined using, e.g., a table, data structure, and/or index, an example of which will be described below in reference to FIG. 5.

Regardless, after at least one opinion and/or emotion is determined based on the expression, the logic moves to block 62 where the at least one opinion/emotion is populated into a database accessed by the server, and/or assembled or grouped together in a data structure or index to be stored on a storage medium (such as the server's storage medium). Thus, it is to be understood that the database and/or data structure may include the opinions/emotions of plural individuals who viewed the same piece of content. Even further, it is to be understood that the opinions/emotions may be grouped together and/or populated into the database based on, e.g., viewer demographics and/or the type of opinion. For instance, favorable opinions of the content may be grouped together and unfavorable opinions of the content may be grouped together, though it is to be understood that other opinions may be specified as well. Types of opinions will be discussed further below.

Concluding FIG. 3 at block 64, in addition to the populating and/or assembling discussed above, the logic may tally a total number of each particular opinion or emotion elicited by the content and populate it this data into the database and/or included it in the data structure. Thus, e.g., a tally of a total number of favorable opinions regarding the content and a tally of the total number of unfavorable opinions regarding the content may be populated into the database and/or included in the data structure. Furthermore, if desired, other statistics may be generated at block 64 and populated or included as well, examples of which will be discussed further below.

Moving on, as indicated above, metadata may be used to identify content presented to a viewer. The content may be identified using, e.g., a table, index, or relational database. Accordingly, an exemplary index for identifying content presented to a viewer is shown in FIG. 4. The index 70 shown in FIG. 4 includes a first column 72 that includes a content identification number from the metadata, though it is to be understood that in the same or other embodiments the metadata may include, e.g., a title associated with the content and/or the name of the content itself.

Regardless, the index also includes a second column 74 that identifies the content associated with the content identification number of the metadata. It may be appreciated from FIG. 4 that the index 70 includes plural entries for content and associated identification numbers such as, e.g., soft drink advertisements, automobile advertisements, YouTube Internet videos, network TV programs, and debate programs. Not that the index may include entries not only for programs as a whole, but for particular segments of programs, as may be appreciated from identification numbers eleven and twelve and their associated content. Thus, e.g., the opinions and emotions of viewers may be determined in accordance with present principles not just for an entire network TV sitcom or debate show, but for particular segments of the sitcom or debate show. These segments may be established based on, e.g., commercial breaks or the content provider.

So, for example, a content provider providing a debate show to viewers may divide the show into segments based on which particular panelist on the debate show is speaking such that the content provider may determine the viewers' reactions to particular panelists. E.g., if a first panelist speaks for thirty seconds and immediately thereafter another panelist speaks for thirty two seconds, the segments may be established in respective thirty second and thirty two seconds portions, even if there is no commercial break in between, and thus the content provider may discern the viewers' opinions and/or emotions toward each of the panelists in accordance the principles set forth herein (e.g., a report may be generated based on the information populated to the database described above, or a printable version of a data structure including the opinions may be examined).

Now in reference to FIG. 5, an exemplary table/index associating opinions with expressions in accordance with present principles is shown. As noted above, a table/index such as the exemplary one shown may be used to derive an opinion or emotion of a viewer from an expression made by the viewer, it being understood that the expression was detected from an image using, e.g., the facial recognition software described above.

Accordingly, a table/index 80 is shown in FIG. 5. The table 80 includes a first column 82 that includes one or more expressions, a second column 84 that includes one or more opinions, and a third column 86 that includes one or more emotions. In exemplary embodiments, the expressions, opinions, and emotions, as well as how they are associated with each other, may be predefined.

Thus, e.g., a predefined association is included in the table for the expression of laughter, with the laughter being associated with a favorable opinion of the content and a very happy emotion elicited by the content. When a processor executing logic such as the logic described above generates and/or receives a signal representative of laughter, the processor may use a relational table such as the exemplary one shown in FIG. 5 to associate laughter with the favorable opinion of the content and/or also associate the laughter with the emotion of being very happy, to, e.g., be included in a data structure as described herein.

Continuing the detailed description in reference to FIG. 6, an exemplary user interface (UI) that may be presented to a viewer of content that requests that the viewer share his or her image with a server in accordance with present principles is shown. Accordingly, FIG. 6 shows a television 90 with a camera 92 and a display 94 on which content provided by, e.g., a server or a cable television provider is presented. An exemplary UI/prompt 96 is also shown, which requests that the viewer grant permission to share information such as an image of the viewer gathered by the camera 92 with the provider of the content. However, it is to be understood that other privacy settings may be defined as well. Also, note that the UI 96 is shown as being presented below the content on the display 94, but the UI 96 may be presented in other ways as well, such as, e.g., being presented as a pop-up that is overlaid onto a portion of the content.

Now referencing FIG. 7, another exemplary user UI that may be presented to a viewer of content that requests that the viewer always share his or her image with a server in accordance with present principles is shown. Accordingly, FIG. 7 shows a television 100 with a camera 102 and a display 104 on which content provided by, e.g., a server or a cable television provider is presented. An exemplary UI 106 is also shown, which requests that the viewer grant permission to automatically share information such as an image of the viewer gathered by the camera 102 with the content provider so that a viewer need not be presented with a UI and/or prompt such as the one shown in FIG. 6 for every piece of content.

Note that this "automatic" sharing with, e.g., a server may be established for, e.g., all content ever presented on the display from that point forward, all content from a single content provider, all content presented during a certain time of day or certain day of the week, all content presented to a particular viewer or viewers as recognized by a processor in the TV 100 using facial recognition software and/or as recognized by a processor of the content provider (e.g., a server), all content presented when a viewer(s) is in a particular location relative to the TV 100, all content presented while the camera 102 is on, and/or particular types content or particular programs that are provided (e.g., all baseball games, all dramas, any ten p.m. news program, all motion pictures/movies, any program classified as a comedy, and a particular program only such as Seinfeld), all content provided when there is sufficient lighting in the room to gather an image using the camera 102, etc.

Moving on, it is to be understood that reports, statements, summaries, etc. may be outputted by a computer such as the server 14 (or a computer accessing a server) storing information (e.g., the data structures described herein) pertaining to the opinions and/or emotions of viewers for a particular piece of content. Thus, e.g., a content provider or third party can discern how favorable or unfavorable a set of viewers felt about particular piece of content, as well being able to discern particular emotions elicited by the content. This information may be used by, e.g., advertisers, to refine their targeted advertising strategies, or television studios to refine their programming or writing to better satisfy viewers.

Thus, FIG. 8 shows an exemplary UI 110 that may be presented on a display of, e.g., a computer using a software program that is able access a database, data structure, index, etc. including the opinions/emotions of viewers that is stored on, e.g., a server. The software program is understood to also include code to generate a report of the opinions/emotions automatically (e.g., when the information is received) and/or at the request of, e.g., a content provider. Accordingly, the UI 110 includes the option to generate a report for a particular piece of content, including a "yes" radio button 112, a "no" radio button 114, and a "submit" button 116.

Another exemplary UI is shown in FIG. 9, which may be presented after the "yes" radio button 112 of FIG. 8 is selected and then the "submit" button is selected, thereby causing the UI of FIG. 9 to be presented. However, it is to be understood that the UI of FIG. 9 may be presented without first presenting the UI 110 of FIG. 8.

Regardless, a UI 120 that may be presented on a display of, e.g., a computer is shown in FIG. 9. As shown in FIG. 9, the exemplary UI 120 may include various parameters which, when selected, cause a software program such as the one described above to generate a report not only, e.g, listing favorable and unfavorable opinions and a tally of the total number of favorable and unfavorable opinions, but additional breakdowns based on the parameters. Thus, as may be appreciated from FIG. 9, a report may be generated to include a breakdown of emotions and/or opinions based on, e.g., particular viewer demographics, only particular types of opinions and/or emotions, the time of day the content was viewed, and/or the channel/network on which the content was provided (e.g., commercials may run on various networks, and targeted advertisers may thus determine which networks are best to broadcast particular advertisements to maximize the advertisement's appeal based on the opinions and/or emotions of the viewers of the advertisement on that network).

Furthermore, though not shown in FIG. 9, it is to be understood that still other selectable parameters may be included on the UI 120 to cause a software program to generate specific reports. For example, other parameters may include grouping particular emotions in separate areas of the report, providing commercial ratings for the content (e.g., Nielsen ratings for a program), providing the number of times the content was shared and/or re-blogged to a blog, social networking site, etc., specifying the types of devices on which the content was viewed (e.g., a tally for each type of device, and/or including the type of device next to each particular opinion/emotion listed in the report), specifying the location from which the content was viewed (e.g., a residence, a workplace environment, a public place such as a restaurant, coffee shop, public park, etc.), specifying whether the content was ever paused, fast-forwarded, or re-winded during its viewing, specifying whether the content was switched from window viewing or smaller viewing to full-screen viewing during its presentation, specifying whether the viewer of the content visited a website associated with the content (e.g., the website of a company that was advertised) after viewing the content (which may be determined using, e.g., tracking cookies), specifying whether a link presented with or overlaid onto the content was selected, specifying the image quality of the content that was provided and/or viewed (such as whether the high-definition version of the content was viewed), specifying whether the volume of the device on which the content was viewed was turned up or down during its presentation, specifying whether the channel was changed and/or the content was navigated away from during its presentation, specifying whether the device on which the content was being viewed was turned off during presentation of the content, specifying whether an "information" button was selected (e.g., on a remote control or YouTube UI) during presentation of the content to thereby present additional information regarding the content being viewed, specifying whether the content was recorded using, e.g., a DVR and/or otherwise replayed, specifying particular age demographics of the viewers, etc.

Now in reference to FIG. 10, an exemplary report for a particular piece of content that may be generated in accordance with present principles is shown. A report 130 shown in FIG. 10 and includes a list of particular viewers that are grouped together based on whether their opinions on the particular piece of content to which the report pertains were favorable or unfavorable. Thus, a first column 132 lists each viewer individually, a second column 134 lists indicators as to whether their opinions were favorable (designated by an "F") or unfavorable (designated by a "U"), and a third column 136 lists the particular emotion of the viewer elicited by the content. The third column 136 also optionally includes the particular expression from which the opinion and emotion was derived in parenthesis.

FIG. 11 shows yet another exemplary report for a particular piece of content that may be generated in accordance with present principles, though it is to be understood that the reports shown in FIGS. 10 and 11 may be combined, if desired. Thus, a report 140 includes a tally of the total number of favorable opinions of the content, a tally of the total number of unfavorable opinions of the content, the percent of viewers that were Caucasian, the percent of viewers that were African American, the percent of viewers that were in the age demographic 18-49 years of age, the percent of viewers under the age of 18, the percent of viewers over the age of 49, the percent of viewers that laughed during presentation of the content, and the percent of viewers that smiled during presentation of the content. Note that still other entries may be included in the report based on, e.g., the parameters selected using the UI 120 of FIG. 9.

Note that in accordance with the principles set forth above, the report may be printed, presented on a display screen, sent in an email, etc. Furthermore, note that in still other embodiments, e.g., the data structure itself may be simply viewed, printed, etc., rather than generating a report therefrom. Also note that if desired, the viewer images/video received by the server may be saved/included in the database, data structure, etc. The view images/video may also be included next to each viewer in a report such as the report of FIG. 10, if desired., and/or may otherwise be searchable.

It is to be understood that the figures and descriptions provided above generally show methods steps in conjunction with the devices disclosed herein.

While the particular SYSTEM AND METHOD FOR CORRELATING AUDIO AND/OR IMAGES PRESENTED TO A USER WITH FACIAL CHARACTERISTICS AND EXPRESSIONS OF THE USER is herein shown and described in detail, it is to be understood that the subject matter which is encompassed by the present invention is limited only by the claims.

What is claimed is:

1. A computer device, comprising:
   at least one computer memory that is not a transitory signal and the comprises instructions executable by at least one processor to cause the processor to:
   receive at least one image of at least one viewer of a display on which content is presented;
   generate a signal representative of at least one expression of the viewer made at or around the time the content was presented based on the image of the viewer;
   receive metadata identifying the content and indicating whether the content was recorded pursuant to presentation on the display;
   associate the metadata identifying the content with the at least one expression of the viewer; and
   present a prompt to grant permission to share the image for all content from a single content provider.

2. The computer device of claim 1, wherein the instructions are executable to, prior to receiving at least one image of the viewer, provide the content to the viewer.

3. The computer device of claim 1, wherein the instructions are executable to access at least one database and populate the database with at least one opinion for each of plural viewers regarding the content presented to the viewers, wherein the at least one opinion of each viewer is derived from the at least one expression of each viewer.

4. The computer device of claim 3, wherein the at least one opinion of each viewer is derived from the at least one expression of each viewer using a table that associates opinions with expressions.

5. The computer device of claim 3, wherein the database is populated such that data regarding favorable opinions of the content is grouped together and data regarding unfavorable opinions of the content is grouped together.

6. The computer device of claim 3, wherein the instructions are executable to include a tally of favorable opinions regarding the content and a tally of unfavorable opinions regarding the content.

7. The computer device of claim 3, wherein the database is populated such that it is searchable and/or organizable based on demographics.

8. The computer device of claim 3, wherein the database is populated such that it is searchable and/or organizable based on the type of opinion.

9. A method comprising:
   receiving at least one image of at least one viewer of a display on which content is presented and generating a signal representative of at least one expression of the viewer made at or around the time the content was presented based on the image of the viewer, and/or receiving a signal representative of at least one expression of the at last one viewer made at or around the time the content was presented derived from at least one image of the viewer;
   detecting metadata that identifies the content;
   prompting the viewer to grant permission to share the image of the at least one viewer with at least one server; and
   responsive to a determination that the viewer has granted permission to share the image, providing the metadata identifying the content and the at least one expression of the viewer to the server, and responsive to a determination that the viewer has not granted permission to share the image, not providing the metadata identifying the content and the at least one expression of the viewer to the server, wherein the prompting further includes prompting the viewer to grant permission to share the image for content presented during a certain time of day or certain day of the week.

10. The method of claim 9, wherein the prompting further includes prompting the viewer to grant permission to share the image only for content presented to a particular viewer or viewers as recognized using facial recognition software.

11. A method comprising:
   receiving at least one image of at least one viewer of a display on which content is presented and generating a signal representative of at least one expression of the viewer made at or around the time the content was presented based on the image of the viewer, and/or receiving a signal representative of at least one expression of the at last one viewer made at or around the time the content was presented derived from at least one image of the viewer;
   detecting metadata that identifies the content;
   prompting the viewer to grant permission to share the image of the at least one viewer with at least one server; and
   responsive to a determination that the viewer has granted permission to share the image, providing the metadata identifying the content and the at least one expression of the viewer to the server, and responsive to a determination that the viewer has not granted permission to share the image, not providing the metadata identifying the content and the at least one expression of the viewer to the server, wherein the prompting further includes prompting the viewer to grant permission to share the image for all content from a single content provider.

12. A method comprising:
   receiving at least one image of at least one viewer of a display on which content is presented and generating a signal representative of at least one expression of the viewer made at or around the time the content was presented based on the image of the viewer, and/or receiving a signal representative of at least one expression of the at last one viewer made at or around the time the content was presented derived from at least one image of the viewer;
   detecting metadata that identities the content;
   prompting the viewer to grant permission to share the image of the at least one viewer with at least one server; and
   responsive to a determination that the viewer has granted permission to share the image, providing the metadata identifying the content and the at least one expression of the viewer to the server, and responsive to a determination that the viewer has not granted permission to share the image, not providing the metadata identifying the content and the at least one expression of the viewer to the server, wherein the prompting further includes prompting the viewer to grant permission to share the image only viewers in a particular location relative to the display.

13. A method comprising:

receiving at least one image of at least one viewer of a display on which content is presented and generating a signal representative of at least one expression of the viewer made at or around the time the content was presented based on the image of the viewer, and/or receiving a signal representative of at least one expression of the at last one viewer made at or around the time the content was presented derived from at least one image of the viewer;

detecting metadata that identifies the content;

prompting the viewer to grant permission to share the image of the at least one viewer with at least one server; and responsive to a determination that the viewer has granted permission to share the image, providing the metadata identifying the content and the at least one expression of the viewer to the server, and responsive to a determination that the viewer has not granted permission to share the image, not providing the metadata identifying the content and the at least one expression of the viewer to the server, wherein the prompting further includes prompting the viewer to grant permission to share the image for particular types content.

14. A method comprising:

receiving at least one image of at least one viewer of a display on which content is presented and generating a signal representative of at least one expression of the viewer made at or around the time the content was presented based on the image of the viewer, and/or receiving a signal representative of at least one expression of the at last one viewer made at or around the time the content was presented derived from at least one image of the viewer;

detecting metadata that identifies the content;

prompting the viewer to grant permission to share the image of the at least one viewer with at least one server; and responsive to a determination that the viewer has granted permission to share the image, providing the metadata identifying the content and the at least one expression of the viewer to the server, and responsive to a determination that the viewer has not granted permission to share the image, not providing the metadata identifying the content and the at least one expression of the viewer to the server, wherein the prompting further includes prompting the viewer to grant permission to share the image only programs classified as a comedy.

15. A device, comprising;

at least one computer memory that is not a transitory signal and that comprises executable by at least one processor to cause the processor to:

associate metadata identifying content with at least one expression of at least one observer of the content made at or around the time the content was observed, the metadata further specifying whether the content was switched from window viewing or smaller viewing to full-screen viewing during its presentation, and/or specifying whether a volume of the device on which the content was viewed was turned up or down during its presentation; and present a prompt to grant permission to share an image for particular types content.

16. The device of claim 15, wherein a signal representative of the at least one expression of the observer is generated from at least one image of the observer taken at or around the time the content was observed.

17. The device of claim 15, wherein the instructions further cause the processor to create a data structure that includes at least one emotion elicited by the content for each of plural observers, wherein the at least one emotion of each observer is derived from the at least one expression of each observer.

18. The device of claim 17, wherein the at least one emotion of each observer is derived from the at least one expression of each observer using a table that associates emotions with expressions.

19. The device of claim 15, wherein the instructions further cause the processor to create a data structure that includes tallies of particular emotions elicited by the content, wherein the emotions are derived from expressions made by plural observers.

* * * * *